Dec. 13, 1949     C. W. GOFF     2,491,373
HITCH MECHANISM

Filed Nov. 15, 1947     2 Sheets-Sheet 1

INVENTOR.
CLARENCE W. GOFF
BY Merrill M. Blackburn
ATTORNEY

Dec. 13, 1949     C. W. GOFF     2,491,373
HITCH MECHANISM

Filed Nov. 15, 1947     2 Sheets-Sheet 2

INVENTOR.
CLARENCE W. GOFF
BY Merrill M. Blackburn
ATTORNEY

Patented Dec. 13, 1949

2,491,373

UNITED STATES PATENT OFFICE 2,491,373

HITCH MECHANISM

Clarence W. Goff, Washington, Iowa

Application November 15, 1947, Serial 786,279

1 Claim. (Cl. 280—33.15)

My present invention relates to mechanism for making easy the connection and disconnection of a tractor unit with a drawn unit and is an improvement upon the structure disclosed in my prior application, Serial No. 630,824, filed November 26, 1945, now Patent 2,458,848, dated January 11, 1949. It is in part a continuation of that application, with a disclosure of the new matter added thereto.

This invention comprises among its objects the provision of a hitch mechanism such that a tractor equipped therewith may be backed up to a unit to which it is to be connected and easily and automatically connected thereto with the least trouble on the part of the operator; the provision of a structure for the purpose indicated which is so constructed that the driver of the tractor unit may, merely by pulling on a cord or chain, unlatch the hitch unit from the drawn unit with the least delay possible; the provision of latching means for preventing inadvertent disconnection of the tractor unit from the drawn unit; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Figure 1:
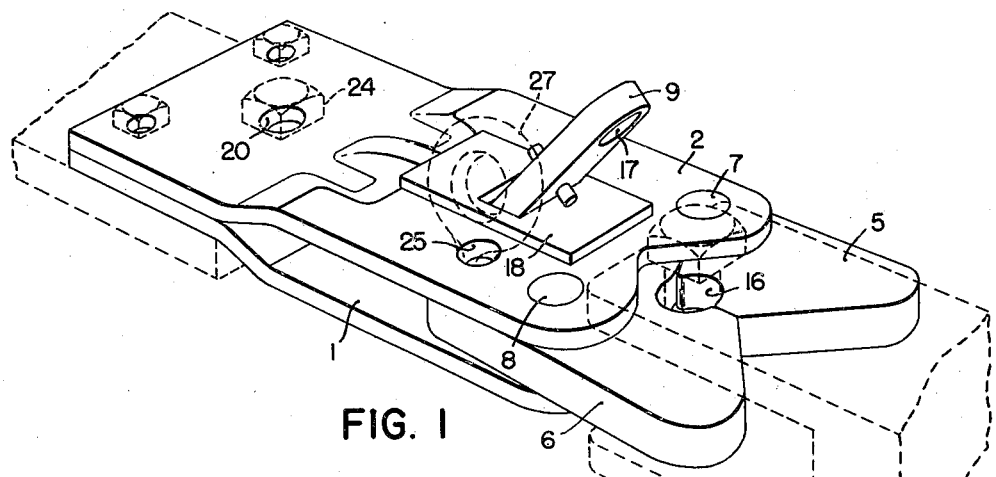
Fig. 1 represents a perspective view of one form of my construction with the jaws closed.
Figure 2:
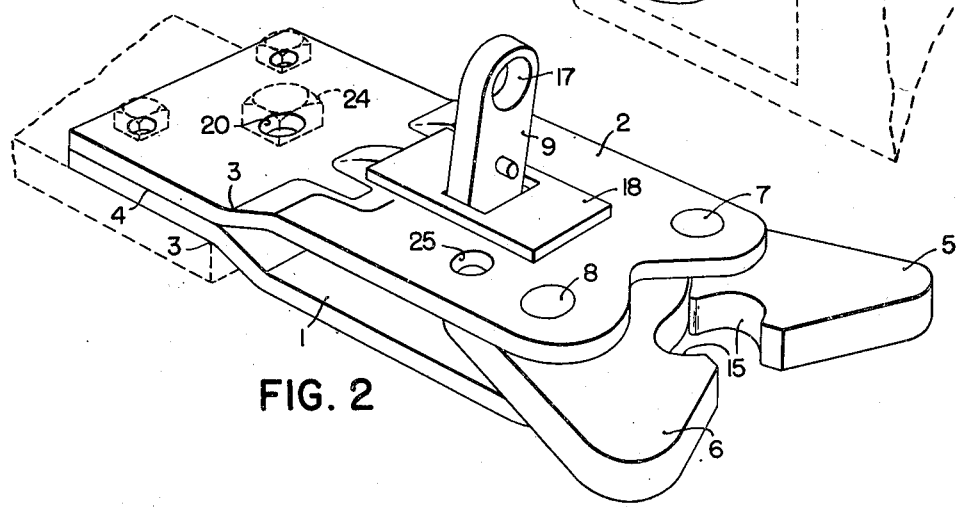
Fig. 2 represents a perspective view of the structure shown in Fig. 1 with the jaws open.

Reference will now be made in greater detail to the annexed drawings for a more complete description of this invention. Specifically, this construction comprises a pair of body members 1 and 2 bent toward each other as shown at 3, the parts being held in assembled relation by being welded together where they contact, as at 4. A pair of jaws 5 and 6 are pivotally mounted between the body members 1 and 2 on pivot members 7 and 8, shown as rivets. A latch member 9 is pivotally connected at its lower end by a pivot member 10 to a pair of connected lugs 11 projecting downwardly from the bottom of the body member 1. This latch member is spring-actuated by a spring 12 which forces it into the space 13 between the rear ends of the jaws 5 and 6 when these jaws are closed. At one end, the spring 12 bears against the members 1 and 2 in the region where they come together and, at its opposite end, against the latch member 9. The spring, being under compression, forces the latch member 9 between the rear ends 14 of the jaws 5 and 6, when the jaws are closed, to hold them in closed posiion. The forward end portions of the jaws are provided with notches 15 which, when the jaws are closed, constitute the hitch pin hole 16.

The upper end of the latch member 9 is provided with an opening 17 for the attachment of a cord, cable, chain, or the like, whereby the latch may be turned to unlatching position when it is desired to unhitch the tractor unit from the drawn unit. The latch member 9 passes through an opening in the cover plate 18 which slides on top of the body member 2 and covers up the opening 19 therein. The rear end portion of the body members 1 and 2 is provided with an opening 20 for the reception of the hitch pin 24 of the traction unit, thus providing for the connection of this hitch mechanism to the tractor. The jaws 5 and 6 are provided on their adjacent edges with fingers 21, 22, and 23 which form interengaging members to cause the jaws to work in unison. Also, the fingers 21 and 22 are engaged by the hitch pin of the drawn unit when the hitch mechanism is backed into a position to cause hitching. When these fingers 21 and 22 engage the hitch pin, they are pushed forwardly thereby, resulting in the jaws 5 and 6 being closed, which permits the latch member 9 to enter between the ends 14 of the jaws 5 and 6, as shown in Fig. 5, thus latching these jaws against being opened by a forward pull of the traction unit.

Figures 7, 8:
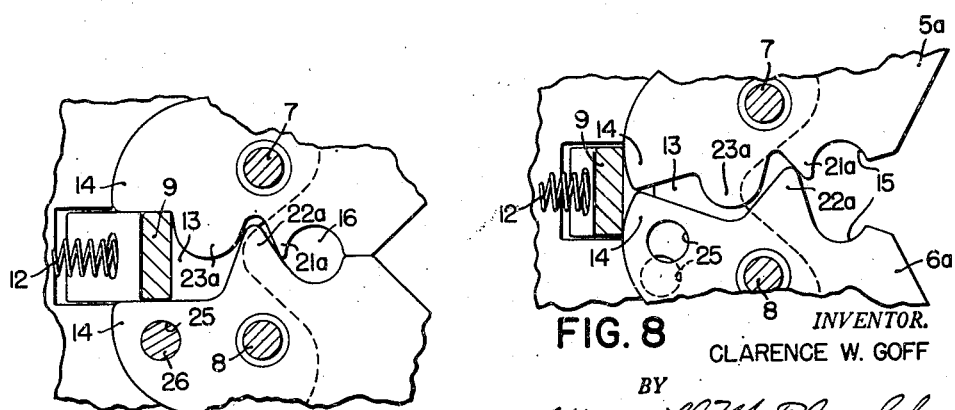
Fig. 7 represents a horizontal section of a modified form of this construction with the jaws in closed position.
Fig. 8 represents a similar section of the structure shown in Fig. 7 with the jaws in open position.
Figure 3:
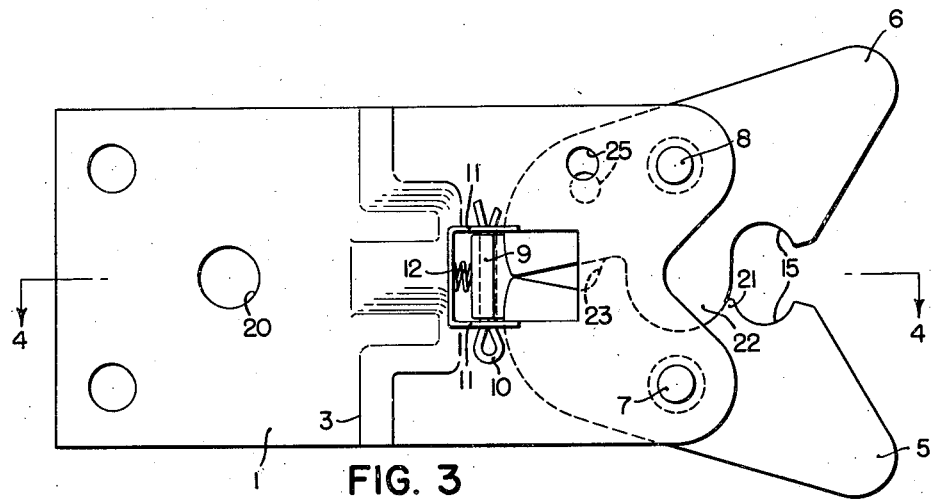
Fig. 3 represents an inverted plan view, taken in the opposite direction from Fig. 2.
Figure 4:
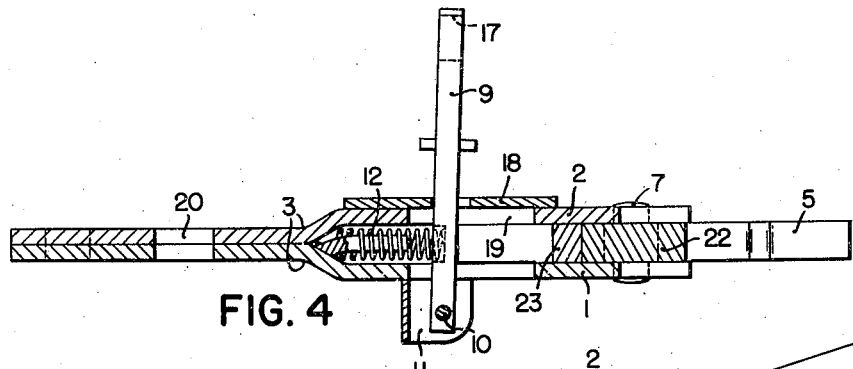
Fig. 4 represents a longitudinal section taken substantially along the plane indicated by the line 4—4, Fig. 2.

In the structure shown in Figs. 7 and 8, the jaws 5a and 6a differ somewhat in form from the corresponding members 5 and 6 referred to above, Also, the fingers 21a, 22a, and 23a, corresponding to fingers 21, 22, and 23, are shaped somewhat differently from the corresponding fingers but function in the same way and produce the same result.

Figure 5:
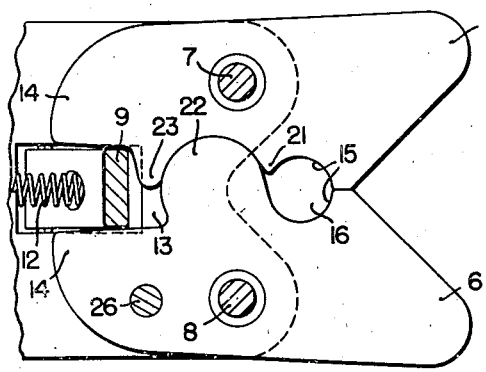
Fig. 5 represents a fragmentary horizontal section of the rear portion of this device with the jaws in closed position.
Figure 6:
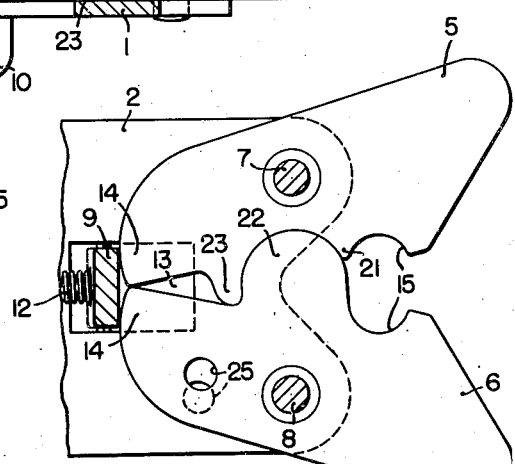
Fig. 6 represents a view similar to that of Fig. 5 with the jaws in open position.

In the structure shown in the various figures, the plates 1 and 2 and the jaws 5, 6, 5a, 6a are shown as provided with openings 25 for the reception of a pin or bolt 26 which is dropped into place when the jaws are closed, as shown in Figs. 1, 5, and 8. This pin may be provided with any type of head but I have chosen to illustrate it as being provided with an eye 27.

It has been found that, in traveling over rough ground or railroad tracks, the latch member 9 may be inadvertently withdrawn from its position between the rear ends of the jaws, as shown in Figs. 1, 5, and 7, thus permitting the drawn machine to become detached from the traction unit. Also, when a cord or chain is connected to the eye 17 of the latch 9, this may be inadvertently moved by a foot or otherwise, thus causing disconnection. However, if a pin or bolt 26 is dropped into openings 25, it is substantially impossible to have inadvertent disconnection take place.

It will of course be understood that the specific description of structure set forth above may be departed from without departing from the spirit of this invention as disclosed herein and defined in the appended claim.

Having now described my invention, I claim:

In a hitch mechanism, a supporting body having spaced upper and lower body members and a pair of laterally separated pivots connecting the body members, a pair of jaws mounted on said pivots and extending forwardly and rearwardly therefrom, said jaws being adapted to be opened and closed and, when closed, engaging each other with a hole between them opening upwardly and downwardly only for the reception of a hitch pin, the rearwardly extending parts of the jaws, when the jaws are closed, being notched to form a latch-receiving opening adapted to receive a latching member, a pivoted latching member carried by the lower body member and adapted to swing into and out of the space between the rearwardly extending parts of the jaws when they are closed and, when swung into position between the jaws, serving to hold the jaws closed, the latching member being a lever pivotally suspended from the lower face of the lower body member and spring-urged into latching position between the rearwardly extending parts of the jaws, said body members being slotted to allow the latching member to swing about its pivot into and out of latching position, the body members being bent, rearwardly from the jaws, into contact, and one of them, adjacent the region of contact, having a finger extending toward the jaws, between the body members, said finger being surrounded by a spring which extends toward the latching member and engages same with a force tending to force the latching member into the latch-receiving opening whereby to hold the jaws closed, and a jaw-holding member extending through one of the jaws and at least one of the body members.

CLARENCE W. GOFF.

REFERENCES CITED

The following references are of record in the file of this patent:

UNITED STATES PATENTS

| Number | Name | Date |
|---|---|---|
| 844,522 | Johnson | Feb. 19, 1907 |
| 1,240,818 | Buller | Sept. 25, 1917 |
| 1,379,133 | Speece | May 24, 1921 |
| 1,576,803 | Anderson | Mar. 16, 1926 |